United States Patent
Zigerlig

[19]

[11] Patent Number: 5,813,728
[45] Date of Patent: Sep. 29, 1998

[54] PROCESS FOR MAKING ROTATING BRUSHES FOR AUTOMATIC CAR WASHES

[75] Inventor: Max Zigerlig, Tenero, Switzerland

[73] Assignee: Nowiteck Establishment, Vaduz, Liechtenstein

[21] Appl. No.: 697,889

[22] Filed: Sep. 3, 1996

[30] Foreign Application Priority Data

Mar. 7, 1996 [CH] Switzerland ................. 00596/96

[51] Int. Cl.⁶ ................................................. A46D 1/08
[52] U.S. Cl. ................................................. 300/21; 300/5
[58] Field of Search ........................ 300/21, 5, 7, 8

[56] References Cited

U.S. PATENT DOCUMENTS

| 3,605,162 | 9/1971 | Long . |
| 3,643,282 | 2/1972 | Lechene et al. . |
| 3,755,847 | 9/1973 | Liebscher . |
| 4,611,359 | 9/1986 | Bivens . |
| 5,605,383 | 2/1997 | Biocca ........................................ 300/21 |

FOREIGN PATENT DOCUMENTS

| 0 463 713 | 1/1992 | European Pat. Off. . |
| 941 364 | 4/1956 | Germany . |
| 29 22 877 | 12/1980 | Germany . |
| 29 29 074 | 1/1981 | Germany . |
| 4-336975 | 11/1992 | Japan . |
| 629 632 | 9/1949 | United Kingdom . |
| WO 94/19986 | 9/1994 | WIPO . |

*Primary Examiner*—John M. Husar
*Attorney, Agent, or Firm*—Young & Thompson

[57] ABSTRACT

A process for making rotating brush (21), in particular, the type used in automatic car washing facilities, and comprising a support (21s) which has inner face (6) and outer face (7), having attached to the outer face flexible cleaning elements (3n), wherein the process includes the following stages:

a) preparation of mold (24) capable of making desired rotating brush (21);

b) arrangement of the flexible cleaning elements (3n) with one end inserted into mold (24) and the other end projecting outwardly;

c) injection into the mold (24) of components in the fluid state intermixed to form synthetic resin (8) which is able to polymerize;

d) opening of mold (24) once polymerization is complete and extraction of brush (21) in which these flexible cleaning elements (3n) are attached to this support (21s) because they are embedded in the polymerized resin.

11 Claims, 2 Drawing Sheets

PROCESS FOR MAKING ROTATING BRUSHES FOR AUTOMATIC CAR WASHES

FIELD OF THE INVENTION

This invention relates to the technological field of rotating brushes, of both flat and cylindrical shape, in particular, those used in automatic car washing facilities.

BACKGROUND OF THE INVENTION

These brushes comprise a support which is flat or cylindrical and which has an inner face and outer face; attached to the outer face are flexible cleaning elements, filiform or of a flat design, which—set in motion by the rotation of the brush—clean the vehicle or whatever flat washable surfaces with which they come into contact.

These cleaning elements, because they are subjected to the action of centrifugal force and because of the friction exerted on the surfaces to be cleaned, need to be attached to their support in a firm and stable way, and currently there are a number of processes for accomplishing this attachment.

When the cleaning elements are of the filiform type, they are gathered into bunches which are attached manually to the support via a long and sometimes costly sewing operation.

When the cleaning elements are of the flat type, whether fringed or not, each must be attached—either by sewing, riveting, soldering or a similar process—to a suitably shaped intermediate support which is then connected to a cylindrical jacket designed so that it can be connected mechanically to a rotating part of the washing device. Since a single brush is composed of a few dozen radially attached flexible cleaning elements, the complex task of preparing a brush, which can be up to 3 or 4 meters long, is an especially long and expensive undertaking.

Efforts have been made to avoid this long preparation time and concomitant high costs by using computer-aided automatic machines for preparing brushes by pressing, but these machines are suitable only for making a certain type of brush with specific dimensions and characteristics, so that in order to change the type of brush being produced, the machine must be re-fitted and the computer program must be reset so that the advantages of using this sort of procedure in terms of production time and costs are more or less cancelled out.

SUMMARY OF THE INVENTION

To solve the problem of production time and costs, the inventor of this invention has designed a brand new process and a brand new type of brush with which it is possible to obtain—by injection into a mold with the use of polymer synthetic resins having a number of fluid components—any type of rotating brush, with a flat or cylindrical support, thereby ensuring stable attachment of filiform, flat or any other type of flexible cleaning element to the support.

The object of this invention, then, is a process for making rotating brushes of the type described above, as described in the attached claim 1.

Another object of this invention is a type of rotating brush which can be made using the process according to the invention in any of its embodiments.

BRIEF DESCRIPTION OF THE DRAWINGS

Some non-limiting and non-restrictive examples of this process will be illustrated in more detail in the description below, in which reference is made to the attached diagrams, which represent the following.

DETAILED DESCRIPTION OF THE INVENTION

It should first be mentioned that the rotating brushes with flat support which will be discussed below can also subsequently be rolled into a cylindrical shape using processes and techniques well known to one skilled in the art.

Figure 1:
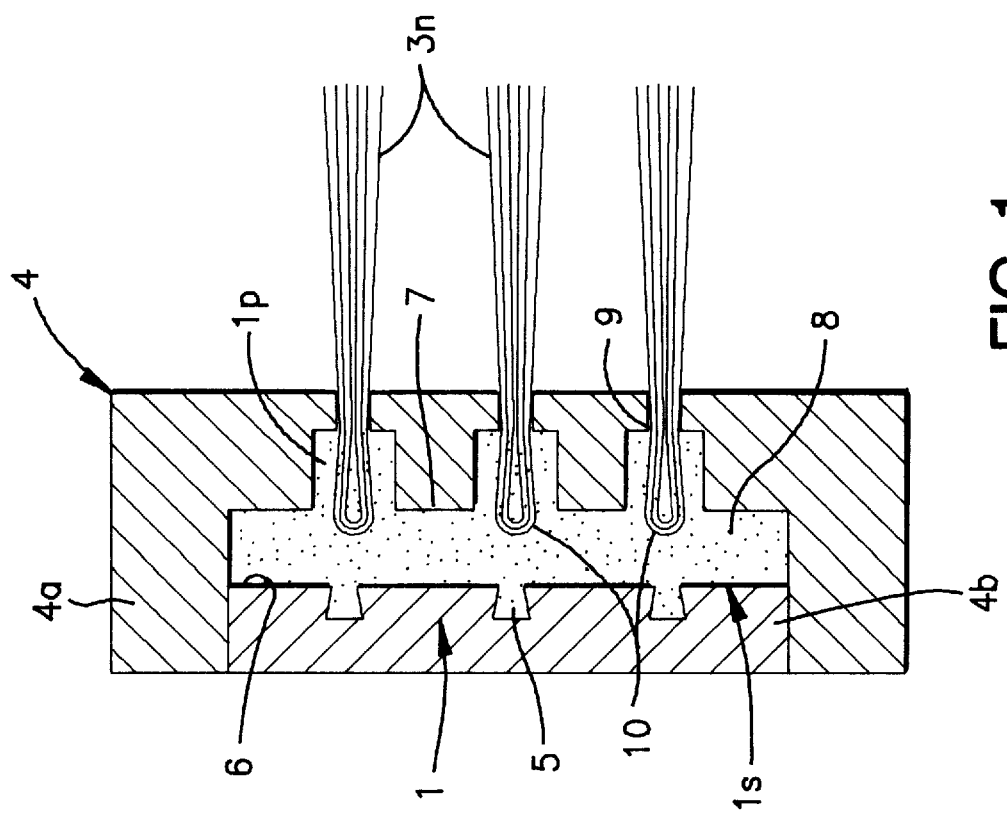
FIG. 1 shows a transverse cross-section of a mold for carrying out the process according to the invention to make a rotating brush comprising a flat support to which filiform flexible cleaning elements are attached.

FIG. 1 shows the process according to the invention being carried out in the case of a brush 1 with flat support 1s and with filiform flexible cleaning elements 3n.

Mold 4 is first prepared, comprising at least two shells 4a, 4b facing one another and defining the shape of brush 1, comprised of said flat support 1s and of a plurality of protuberances 1p perpendicular to its outer face 7.

These flexible cleaning elements 3n, gathered in tufts of appropriate dimensions, are then arranged with one end inserted into mold 4, into the spaces intended to be occupied by these protuberances 1p and with the other end projecting outwardly through a suitable aperture 9 made in mold 4 in such a way as to block it completely.

To obtain a better folded seam, it is advisable to fold each element in half, thus creating a buttonhole 10 which comprises the end to be inserted into the mold. Obviously, in this case, each element 3n projects outwardly with two filiform bodies facing one another, a number of elements combined forming one of these tufts.

Then the components of a polymer synthetic resin in the fluid state are injected in the mold and mixed together.

By proportioning the components properly so that polymerization of the resin causes an increase in volume which entirely fills the hollow parts of the mold, then consequently—without having to resort either to high temperatures or pressures—we obtain the desired rotating brush 1 with flexible cleaning elements 3n embedded in resin 8, and therefore attached in a stable manner to support 1s.

On inside face 6 of this support 1s, by simple shaping of mold 4, it is also possible to make, during forming, projections 5 or indentations (not shown) having a shape and dimensions which enable them to be inserted in the appropriate indentations or projections for attachment which can be made on a grooved metal jacket of known type capable of being secured to a rotating element of a washing device.

Thereby, in a single rapid operation, a rotating brush 1 with flexible cleaning elements 3n can be obtained and it is complete and ready for use.

Figure 2:
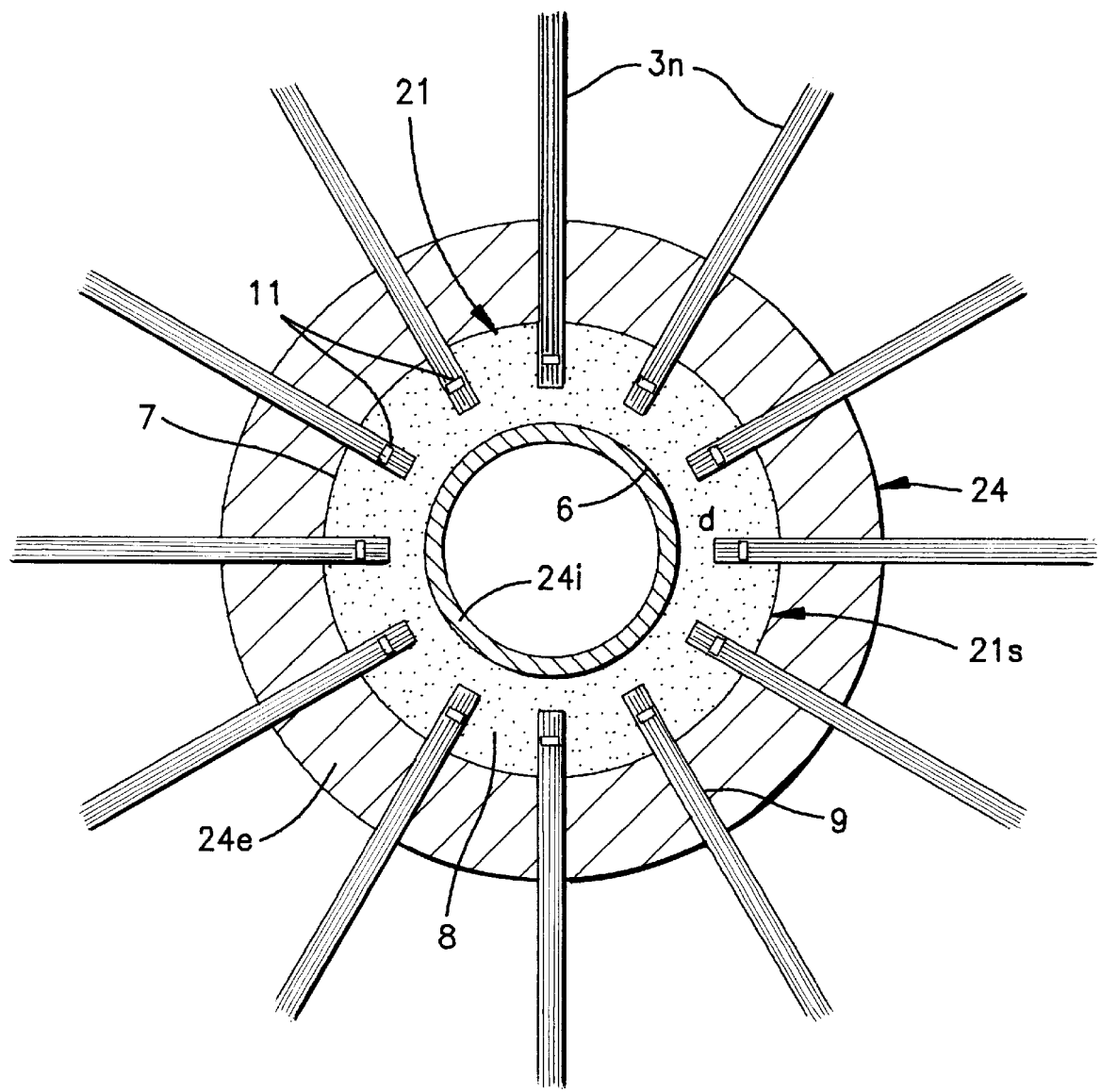
FIG. 2 shows a transverse cross-section of a mold for another embodiment of the process according to the invention, to make a rotating brush with a cylindrical support and flat radial cleaning elements.

FIG. 2 shows the shape and arrangement of parts of mold 24 in a preferred embodiment of the process according to the invention, for producing rotating brush 21 with cylindrical support 21s and with radial cleaning elements 3n of the flat type. In this case, mold 24 comprises two coaxial cylinders 24i, 24e. On the radially outermost cylinder 24e there is a series of cavities 9 equidistant from one another, with a length and width essentially equal to the length and width of flexible cleaning elements 3n—fringed or unfringed—which are to be used.

In the space between the two cylinders 24i, 24e there is cylindrical support 21s for the rotating brush. These cleaning elements 3n are inserted through cavities 9 so as to project into mold 24 to a desired depth and in such a way as to leave distance d between their end located inside mold 24 and the innermost cylinder 24i. Thus a ring of synthetic resin is formed with thickness d capable of withstanding the various mechanical stresses to which brush 21 is subjected.

By injecting the fluid components of synthetic resin 8 into mold 24, in the manner described previously, in this case also we can obtain, in a single operation, a cylindrical rotating brush 21 which is already ready to use and need only be pulled from the mold once the synthetic resin polymerizes.

Obviously, using this embodiment of the process according to the invention we can also obtain—by properly shaping internal cylinder 24i—projections for attaching the brush which are completely identical to projections 5 in FIG. 1 or indentations having a similar function.

On the end of the flat cleaning elements 3n which are located in the space between the two coaxial cylinders 24i, 24e, there should be a plurality of holes 11 which pass through, thus providing synthetic resin 8 with a means of entering and passing through them, thus forming a series of mechanical bonds more stable than simple embedding.

It is also possible, in a manner similar to that described for filiform cleaning elements, to fold the flat cleaning elements in two, thus forming a loop along their entire length, and to insert this loop, on which there are through openings arranged on its apex or on its sides so that the synthetic resin, after having passed through it, fills up this loop, creating a new bond with a desired mechanical resistance to breakage. This case is not represented in the diagrams.

In preferred embodiment for making a rotating brush of the type described just above, coaxial cylinders 24i, 24e comprising the mold are made of synthetic resin, for example polyethylene, so as to emerge out firmly embedded due to adherence of the synthetic resin 8 comprising the body of the brush, forming a whole with the latter, and thus being used as part of a "disposable" mold which functions as a layer on the outer and inner surface of the body of the brush, which advantageously can be sold and used as is.

Thus, the problem of maintaining and re-fitting the molds is solved and the disassembly stage requiring detachment of the molds from the brush and subsequent polymerization of the synthetic resin which comprises the body is eliminated.

Moreover, a rotating brush is obtained which has a compact layer resistant to mechanical or chemical stresses of various types, thereby eliminating the cost of depreciation of the molds, a cost which can become considerable when there is a need to produce a limited number of rotating brushes with a certain type of mold, as is frequently the case.

Figure 3:
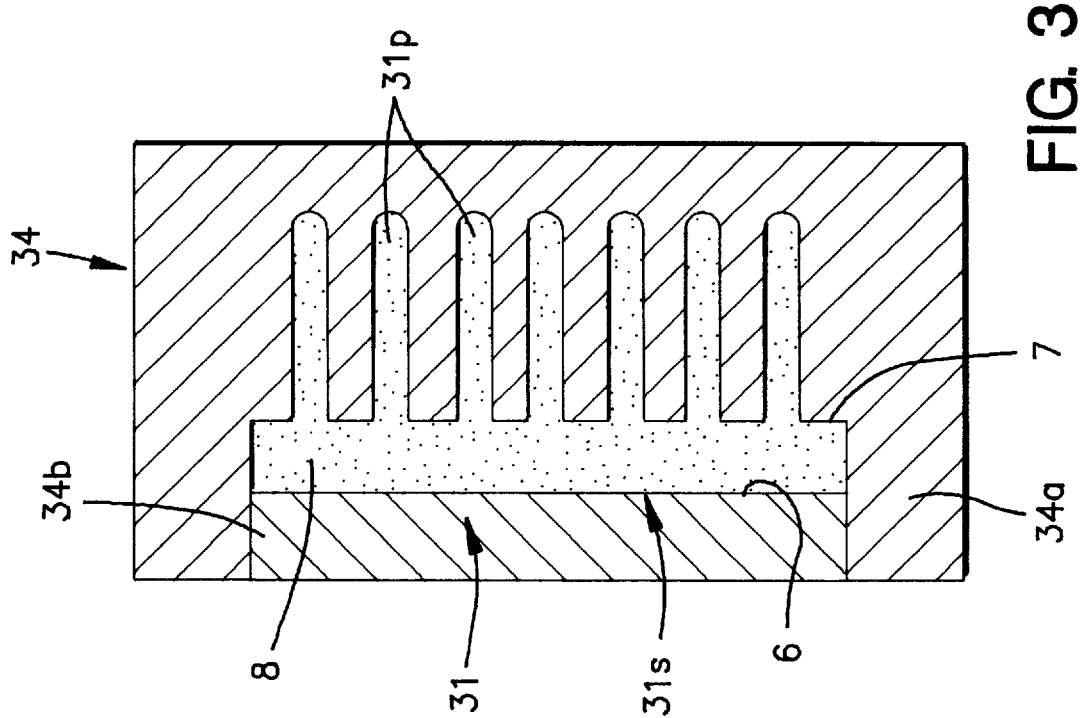
FIG. 3 shows a transverse cross-section of a special type of mold for carrying out the process according to the invention to make a rotating brush in which the flexible cleaning elements are composed solely of protuberances jutting out from the support.

FIG. 3 shows a certain type of mold 34 which can be used to carry out the process according to the invention, to produce a rotating brush 31 with flat support 31s and without the addition of flexible cleaning elements of the type described above.

In this case, the different parts 34a, 34b of mold 34 are made in such a way as to form brush 31 with flat support 31s, having cylindrical protuberances 31p, or protuberances with some other shape, but having dimensions which enable them to act as flexible cleaning elements. In this case, the openings of the mold for insertion of the flexible cleaning elements must obviously be closed. The choice of synthetic resin to be used will exhibit the different physical and mechanical characteristics of the cleaning elements thus obtained, depending on the function (for example fine or rough washing) they will perform.

For producing the rotating brushes using the process according to the invention, various types of polymer synthetic resin having a number of components which are initially in the fluid state can be used, as long as the entire area of the mold is filled thoroughly after polymerization.

The inventor suggests, however, that polyurethane foam be used which, as is known, is composed of isocyanate and polyol and polymerizes with the addition of water.

Any of various types of cleaning elements can be chosen, adapting to them the method of the process and the shape of the molds, including a filiform design, made from filaments composed of a synthetic material, including polythene, nylon and polypropylene, or a flat design, fringed or unfringed, made of a felt pad composed of polyethylene, polyethylene with vinyl acetate added, or of a plastic foam with closed cells such as for example polyurethane.

Obviously, the process according to the invention, as well as the shape of the various molds to be used to carry it out, can be modified so as to be different from the ones described above and shown in the diagrams, but even if made differently, if it corresponds to the contents of the attached claims it remains within the scope of the protection conferred by this patent.

I claim:

1. Process for making a rotating brush for use in automatic car washing facilities, and comprising a support which has an inner face and an outer face, and flexible cleaning elements attached to the outer face, the process comprising:
    a) preparing a mold defining the shape of the desired rotating brush;
    b) arranging the flexible cleaning elements with one end inserted into the mold and the other end projecting outwardly through suitable openings made in the mold;
    c) injecting into the mold components of a polymer synthetic resin in the fluid state, said components being proportioned to cause polymerization of the resin whose volume increases and fills the mold, said polymerization taking place without any added heat or pressure; and
    d) opening the mold once polymerization is complete, and extracting the brush in which the flexible cleaning elements are attached to a support and embedded in the polymerized resin.

2. Process according to claim 1, wherein the mold comprises at least two shells for making a brush having a flat support panel, said mold having on the outer face a plurality of perpendicular protuberances with one end of the flexible cleaning elements inserted in the mold into spaces intended to be occupied by said protuberances and with the other end projecting outwardly.

3. Process according to claim 1, wherein the mold has an inner cylinder and an outer coaxial cylinder defining a space therebetween, the outer cylinder having a plurality of apertures for allowing radial insertion of at least one end of one or more flexible cleaning elements in the space between the two coaxial cylinders, and wherein the components of the polymer synthetic resin are fluidly injected into said space so that the resin, after complete polymerization, fills the space, thereby embedding and securing the ends of the flexible cleaning elements.

4. Process according to claim 3, wherein the coaxial cylinders are made of a thermoplastic synthetic resin which can be embedded by adherence of synthetic resin filling the space between the cylinders.

5. Process according to claim 1, wherein the flexible cleaning elements are filiform and made with filaments of a synthetic material selected from the group consisting of polythene, nylon and polypropylene.

6. Process according to claim 1, wherein the flexible cleaning elements are flat, fringed or unfringed, and made of felt.

7. Process according to claim 1, wherein the flexible cleaning elements are flat, fringed or unfringed, and made of closed-cell plastic foam.

8. Process according to claim 1, wherein the flexible cleaning elements are flat, fringed or unfringed, and made of polyethylene or polyethylene with vinyl acetate added (EVA).

9. Process according to claim 1, wherein the mold comprises at least two shells, said mold having on an external face a plurality of projecting protuberances having a shape and dimensions which enable the protuberances to themselves function as flexible cleaning elements.

10. Process according to claim 1, wherein the mold has on the internal face of support a plurality of projections or indentations having a predetermined shape and dimensions.

11. Process according to claim 1, wherein the components are isocyanate, polyol, and water, and the polymerized synthetic resin is polyurethane.

* * * * *